US006134267A

United States Patent [19]

Schäfer et al.

[11] Patent Number: 6,134,267

[45] Date of Patent: Oct. 17, 2000

[54] DETECTION METHOD FOR THE TRANSMITTER IDENTIFICATION INFORMATION SIGNAL IN THE NULL SYMBOL OF A DAB STREAM

[75] Inventors: Wolfgang Schäfer, Waiblingen; Jürgen Grässle, Tübingen; Markus Zumkeller, Schwaikheim, all of Germany

[73] Assignee: Sony International (Europe) GmbH, Cologne, Germany

[21] Appl. No.: 09/149,819

[22] Filed: Sep. 8, 1998

[30] Foreign Application Priority Data

Sep. 9, 1997 [EP] European Pat. Off. .............. 97115649

[51] Int. Cl.[7] .................... H04B 17/00

[52] U.S. Cl. .................... 375/224

[58] Field of Search .................... 375/224, 316, 375/377, 260, 342, 219; 370/210, 203; 455/347, 463, 71; 325/341

[56] References Cited

U.S. PATENT DOCUMENTS

| | | | |
|---|---|---|---|
| 5,787,123 | 7/1998 | Okada et al. | 375/324 |
| 5,796,785 | 8/1998 | Spiero | 375/316 |
| 5,850,605 | 12/1998 | Souissi et al. | 455/437 |
| 5,946,293 | 8/1999 | Beale et al. | 370/210 |

FOREIGN PATENT DOCUMENTS

| | | |
|---|---|---|
| 0 692 889 | 1/1996 | European Pat. Off. . |
| 2 287 384 | 9/1995 | United Kingdom . |
| WO 93/11616 | 6/1993 | WIPO . |
| WO 95/07581 | 3/1995 | WIPO . |

*Primary Examiner*—Chi H. Pham
*Assistant Examiner*—Khai Tran
*Attorney, Agent, or Firm*—Frommer Lawrence & Haug, LLP.; William S. Frommer; Gordon Kessler

[57] ABSTRACT

A DAB stream starts with a so-called null symbol for the receiver synchronization carrying a transmitter identification information, i.e. TII, signal. Each transmitter in the single frequency network is assigned a main id and a sub id for unique identification. This identification is mapped to a certain pattern with 16/8/4/2 set carrier pairs in the spectrum of the null symbol according to the DAB modes I–IV. Based on mode II which has 384 valid carriers a so called comb block is defined. For modes I and IV this block is repeated 4 and 2 times, respectively. For mode III only a half block is available. This pattern is transmitted every 2nd DAB frame in the null symbol.

To detect the set carriers the steps of differential demodulation of TII pairs included in the spectrum ($S_1(\omega)$) of every second null symbol of the incoming DAB stream (S1, S2, S3) to respectively obtain a demodulated null symbol, correction of carrier phases of the demodulated null symbol spectrum (S4), determination of a threshold (S7), and decision if a carrier is set or not by comparing the carrier level to the determined threshold (S6) are performed.

14 Claims, 12 Drawing Sheets

DETECTION METHOD FOR THE TRANSMITTER IDENTIFICATION INFORMATION SIGNAL IN THE NULL SYMBOL OF A DAB STREAM

FIELD OF THE INVENTION

This invention generally relates to the detection of transmitter identification information, i.e. TII, and more particularly to detect such a TII in a DAB stream.

BACKGROUND OF THE INVENTION

FIG. 9 shows an overview of the complete DAB system. Such a system comprises an audio encoder 1, a convolutional encoder 2, a time interleaving circuit 3, a circuit to generate a fast information channel with a TII database 4, a multiplexer 5, a frequency interleaving circuit 6, a phase reference symbol generator 7, a null symbol generator plus TII generating circuit 8, a multiplexer 9, an IFFT circuit 10, a D/A-converter 11, and an RF transmitter 12 on a sender side to transmit audio data and information data over a channel 13, and an RF receiver 14, a A/D-converter 15, a FFT circuit 16, a synchronization circuit 17, a TII detection circuit 18, a demodulation circuit 19, a deinterleaving circuit 20, a Viterbi decoder 21 and an audio decoder 22 to retrieve the audio data and information data from the channel 13 on the receiver side. These components are connected and work in a well-known fashion. The present invention only concerns the TII detection as it takes place in the TII detection circuit 18, therefore, the following description will only be related thereto.

According to the ETS 300 401 standard the DAB stream starts with a so-called null symbol followed by a so called TFPR-Symbol for the receiver synchronization. The null symbol is also defined to carry a TII signal. Each transmitter in the single frequency network is assigned a main id and a sub id for unique identification. This identification is mapped to a certain pattern with 16/8/4/2 set carrier pairs in the spectrum of the null symbol according to the DAB modes I–IV. Based on mode II which has 384 valid carriers a so called comb block is defined. For modes I and IV this block is repeated 4 and 2 times, respectively. For mode III only a half block is available. This pattern is transmitted every 2nd DAB frame in the null symbol spectrum. The set carriers have to be detected and the respective main and sub ids have to be calculated. Additionally thereto, the complete list of all main and sub ids available in a single frequency network are transmitted in a fast information channel, i.e. FIC, of the date stream. With the help of TII the receiver can filter automatically local information from the data stream.

FIG. 11 shows the spectrum of a null symbol including TII of the incoming DAB stream in the receiver. The spectrum shown is transmitted in DAB mode I where 4 comb blocks are available. This means that the set TII pairs are transmitted four times within every second null symbol.

The construction of the TII was also defined with the regard to a possible navigation. The use of neighbouring carrier pairs allows the estimation of the propagation delay by evaluating their phase difference. If three delays are known from the reception of three transmitters, i.e. three TII codes, a localisation of the mobile receive is possible with hyperbolic navigation.

In a Diploma thesis "Sendererkennung im Gleichwellennetz" by Petra Stix made for Sony Deutschland GmbH and University Stuttgart, Institut für Nachrichtenübertragung, the following method to detect TII in a DAB stream as shown in FIG. 10 is published.

First, in a step P1, the spectrum $S(\omega)$ of a null symbol including TII, as it is shown in FIG. 11, is derived. In the next steps P2 and P3, the absolute value of the complex amplitudes of the four equal comb blocks transmitted in said symbol are added, because only the amplitudes of the TII carriers must be detected and the single phases of the carriers are not relevant for this detection. Herewith, the signal power is increased in comparison to the noise, if the signal is above the noise level. Thereafter, in step P4, two neighbouring carriers are added, since always carrier pairs are set for TII and therewith the signal power is increased again. Before the set carriers are decoded to main and sub ids in steps P9 and P10, a decision has to be made if a respective carrier is set in step P5. Therefore, a threshold is necessary. This threshold is derived from the noise power in the spectrum in the left and right of the DAB block in step P6 that gets multiplied with the number of TII frequency blocks in step P7 and with 2 in step P8, before being used to determine whether a carrier is set or not in step P5.

This method for deciding if there is a certain carrier set fails at low signal-to-noise ratios, not at last because the method for determining the threshold is practically not useful due to the spectrum shape in the receiver, as it is shown in FIG. 11. Further, the error of the estimated propagation delays at low signal-to-noise ratios rises exponentially so that a navigation or localisation is very inaccurate.

SUMMARY OF THE INVENTION

Therefore, it is the object of the present invention to provide an improved detection method for the transmitter identification information signal in the null symbol of a DAB stream that delivers reliable results even at low signal-to-noise ratios.

The method to detect transmitter identification information in a DAB stream according to the present invention comprises the following steps:

a) differential demodulation of TII pairs included in the spectrum of every second null symbol of the incoming DAB stream to respectively obtain a demodulated null symbol spectrum;

b) correction of carrier phases of the demodulated null symbol spectrum with the TFPR phase reference symbol;

c) determine a threshold; and d) decide if a carrier is set or not by comparing the carrier level to the threshold determined in step c).

Through a sophisticated signal processing of the TII carriers including the differential demodulation of TII pairs included in every second null symbol spectrum of the incoming DAB stream the sensitivity for the detection of transmitters is increased and the misdetection rate is decreased. Therewith, the accuracy of the delay estimation is enhanced so that also at low signal-to-noise ratios a navigation with a sufficient precision is possible.

Preferably the step of differential demodulation of the TII pairs comprises the following two steps of grouping pairs of frequencies, comprising a first frequency and a second frequency and calculating the product of the complex amplitude of the first frequency with the conjugate complex of the second frequency, wherein the first and second frequencies respectively correspond to the frequencies of a TII pair.

Preferably the threshold value is determined noise adapted.

Further preferred embodiments of the present invention are defined in the dependent claims.

Advantageous and satisfyingly tested embodiments of the method to detect the transmitter identification information in a DAB stream according to the invention are subsequently described with reference to the accompanying drawings. However, this description of the embodiments is not to be understood as limitation to the inventive concept, the scope of which is defined as the subject matter of claim 1 including equivalent method steps and advantageous improvements thereof.

BRIEF DESCRIPTION OF THE DRAWINGS

Throughout the following description, the same reference signs are used for the same elements or components of essentially the same function.

DETAILED DESCRIPTION OF THE INVENTION

Figure 1:
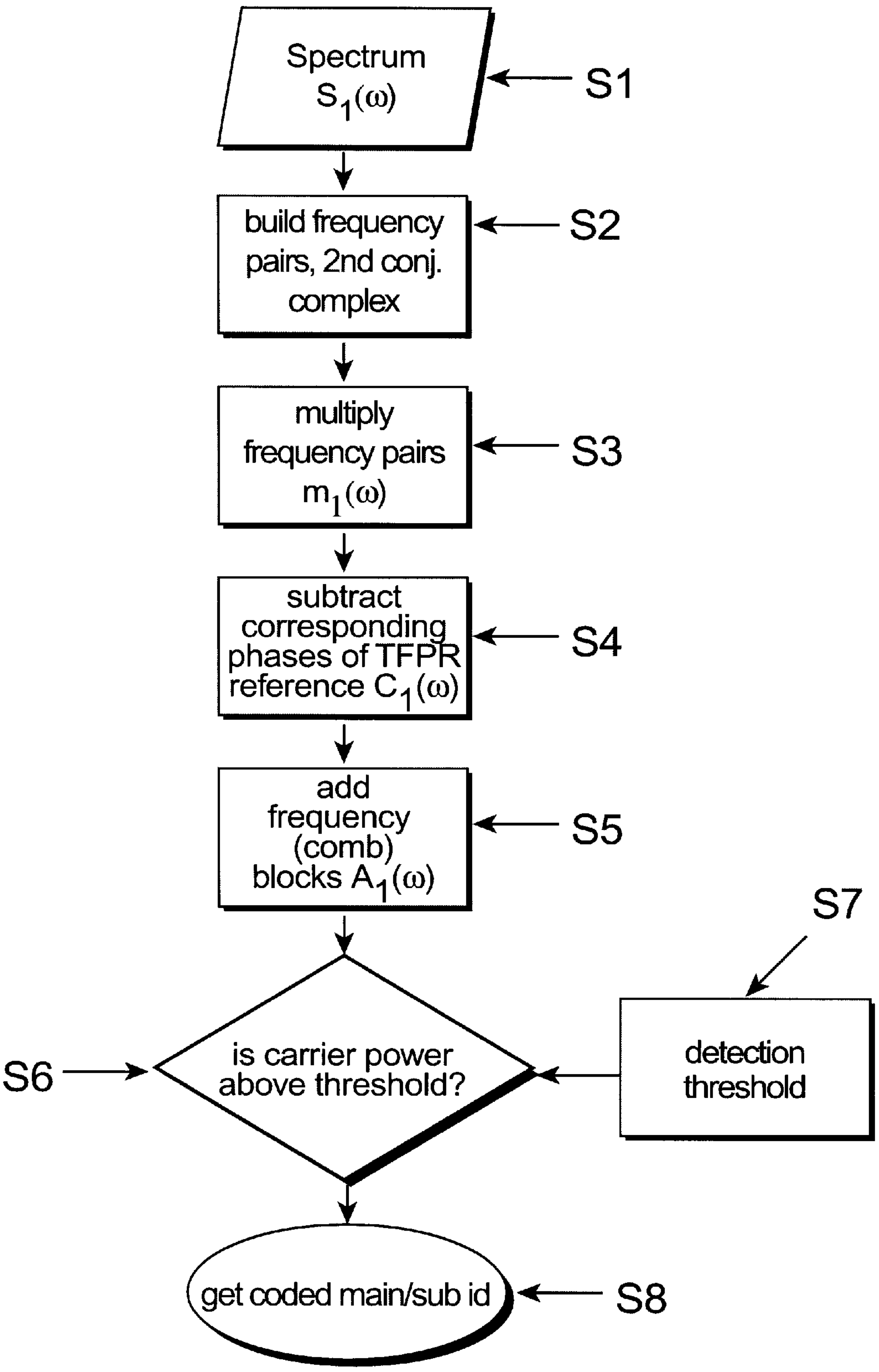
FIG. 1 shows a first embodiment of the method according to the present invention that is the basic embodiment.

FIG. 1 shows the basic method to detect the transmitter identification information in a DAB stream according to the present invention.

In a first step S1 a spectrum $S_1(\omega)$ of a null symbol including TII pairs of the incoming DAB stream is calculated.

In the following steps S2 and S3 the spectrum $S_1(\omega)$ derived in step S1 is differentially demodulated by grouping pairs of frequencies, i.e. the same as for the TII pairs, in step S2 and calculating the product of the complex amplitude of one frequency with the conjugate complex of the second one in step S3 to derive a spectrum $M_1(\omega)$.

Thereafter, in step S4, the resulting carrier phases of the spectrum $M_1(\omega)$ are corrected, as the TII carriers have a phase offset from the transmitter. The offset is the same as in the TFPR symbol as specified in the ETS 300 401. The correction of the carrier phases in step S4 is performed by subtracting the corresponding phase differences of the TFPR reference symbol. As the TFPR symbol has only 4 possible phases, i.e. 1, j, −1, j, the correction with its corresponding phase difference is just a swapping of real and imaginary parts and changing signs. The result of this operation is a spectrum $C_1(\omega)$.

Figure 11:
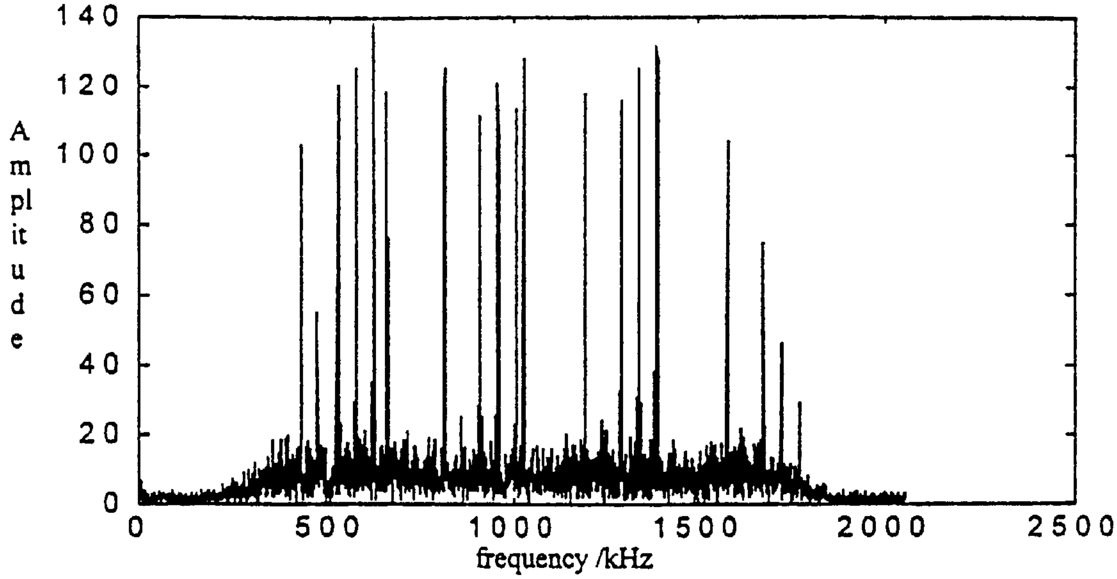
(PRIOR ART) FIGURE 11
FIG. 11 shows the spectrum shape of an incoming null symbol including TII in the receiver.

After the correction of the phases in step S4, the 4 comb blocks of the spectrum $C_1(\omega)$ transmitting the same pattern of set TII pairs, as shown in FIG. 11, can be added for DAB mode I to receive a result $A_1(\omega)$. The set carriers add because of correlated phases, but the noise gets relatively smaller because of its uncorrelated phase. This is only performed and an advantage for DAB modes I and IV, where respectively 4 or 2 comb blocks are available, this step S5 is omitted for all other DAB modes.

In the next step S6 it is determined for each carrier if the respective carrier power is above a threshold value determined in step S7 or not. If the carrier power is above the threshold value than "1" is set for the respective carrier, otherwise "0" is set. In the following step S8, the coded main and sub ids are retrieved and can be used e.g. for a navigation by evaluating the phase difference of its carriers.

Figure 2:
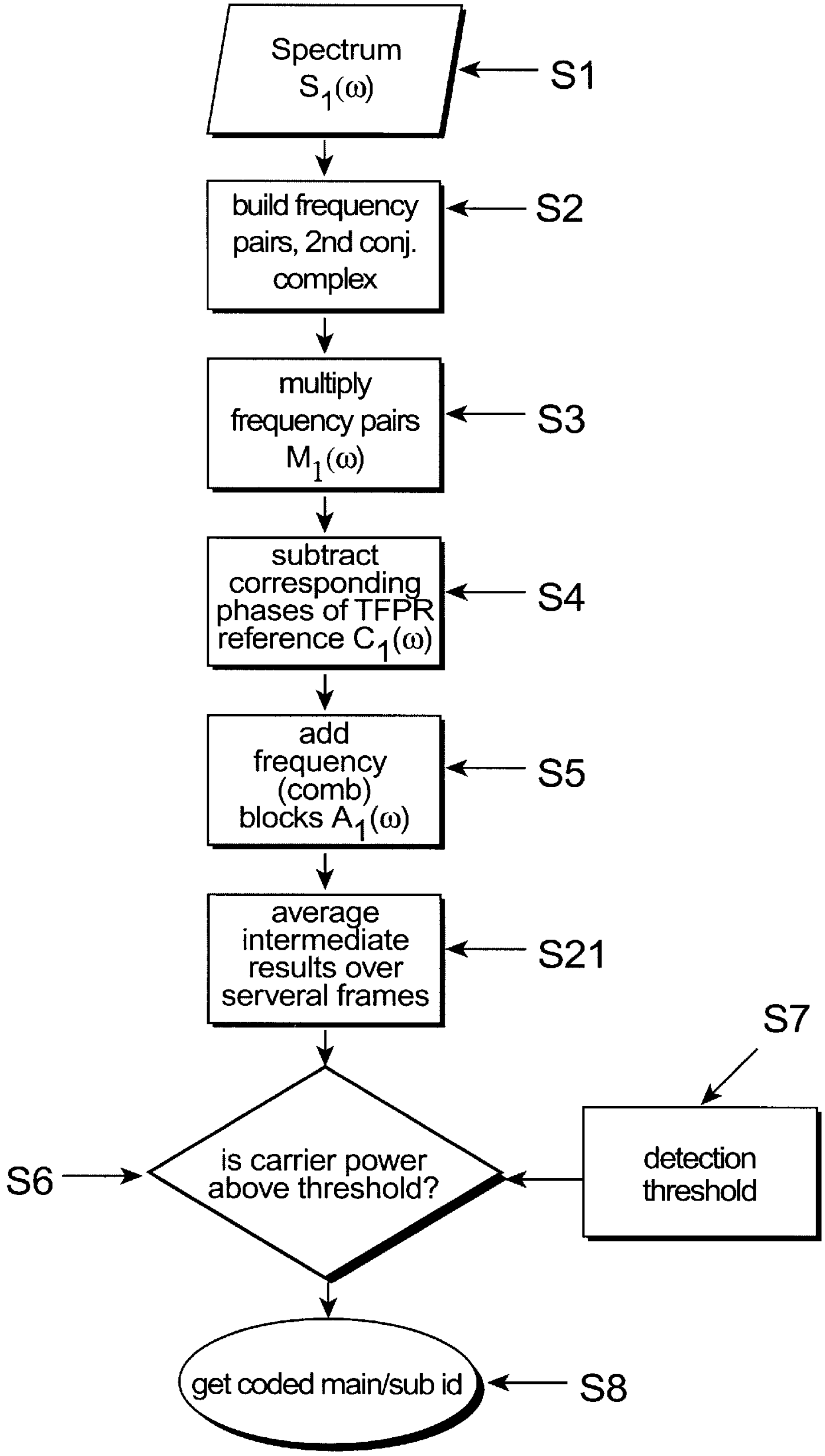
FIG. 2 shows a second embodiment according to the method of the present invention.

FIG. 2 shows a second embodiment of the method to detect transmitter identification information according to the present invention. Basically the same steps as in the basic embodiment described in connection with FIG. 1 are performed. Additionally, a step S21 of averaging intermediate results over several frames is inserted in-between steps S5 and S6.

Figure 12:
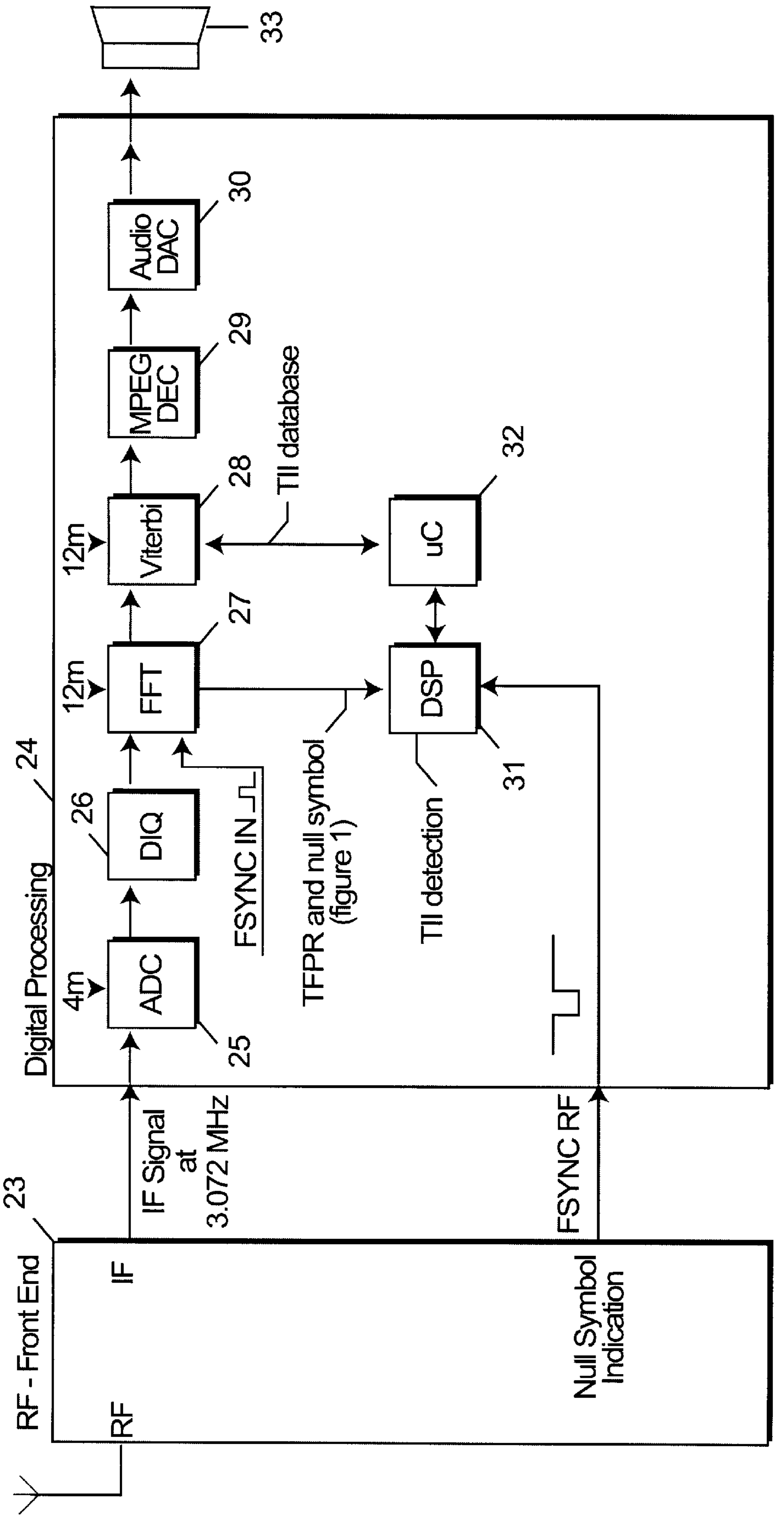
FIG. 12 shows a possible embodiment of a DAB receiver.

This step is inserted because the detection of smaller TII carriers is difficult or even impossible in the presence of a stronger one if the signal-to-noise ratio is near the sensitivity limit of the receiver, because their power is in the order of the noise level and the dynamic range of the signal is limited due to A/D converter and the FFT chip (25 and 27 in FIG. 12). The detection limit can be decreased by some dB if the null symbols with TII are add over several frames. By adding the complex amplitudes the mean noise power is constant, because of its uncorrelated phase structure, but at the set TII carriers the amplitudes add because of nearly the same phase angle. The gain increases with the number of averaged frames. Due to the non-stationary phase of the carriers over the whole transmission system, this simple strategy does not necessarily work properly as this may result in additional phase shifts for the whole symbol from frame to frame. This problem gets encountered with the differential demodulation of the null symbol already described in connection with the basic embodiment shown in FIG. 1. That means that the product of a carrier with its conjugate complex successor is calculated for the whole null symbol. The demodulated null symbols can be added for the selected frames with the properties mentioned above. Therefore, step S21 is inserted after demodulation steps S2 and S3, but with less effort for memory and number of calculations after step S5.

Figure 3:
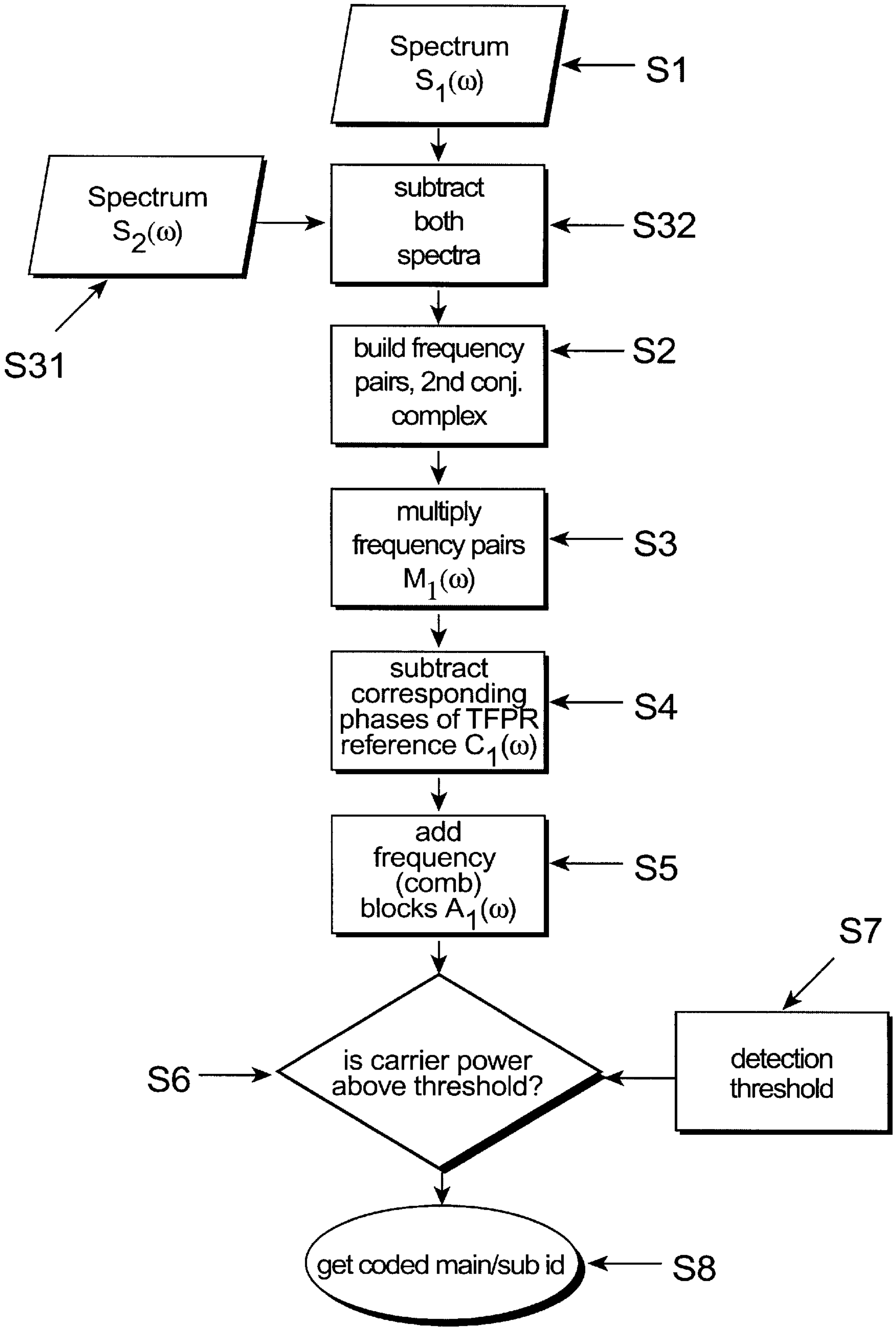
FIG. 3 shows a third embodiment according to the method of the present invention.

FIG. 3 shows a third embodiment of the inventive method to detect transmitter identification information in a DAB stream. In comparison with the basic embodiment shown in FIG. 1, the third embodiment additionally comprises steps S31 of deriving the spectrum $S_2(\omega)$ of a null symbol not including TII pairs and step S32 of subtracting the spectra derived in steps S1 and S31. Therefore, step S32 is inserted after steps S1, S31 that are performed in parallel and before step S2.

In step S32, the difference between the null symbol with TII and the null symbol without TII is calculated. This operation cancels systematic errors of spurious frequencies of interference and other amplitude offsets, e.g. the shape of a SAW filter in the front end which is responsible for the increase of the mean amplitude of the spectrum, as shown in FIG. 11.

Figure 4:
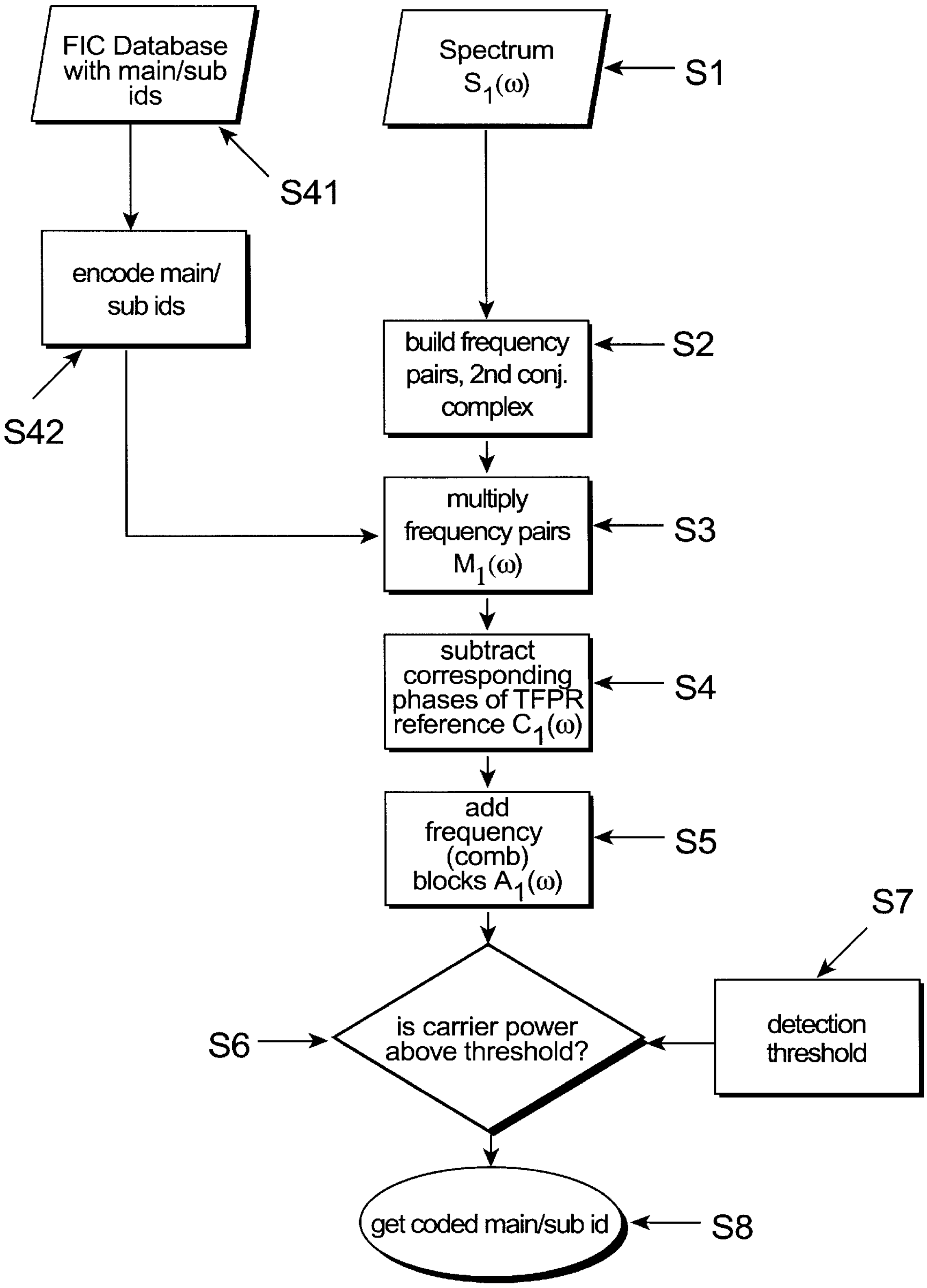
FIG. 4 shows a fourth embodiment according to the method of the present invention.

FIG. 4 shows a fourth embodiment of the method to detect transmitter identification information in a DAB stream according to the present invention. This fourth embodiment comprises the additional steps S41 of receiving the fast information channel database with main and sub ids and encoding the main and sub ids in step S43 additionally to the basic method shown in FIG. 1. These steps are performed in parallel with step SI of deriving the spectrum $S_1(\omega)$ of a null symbol including TII pairs. The operations following thereafter have now just to be performed for the positions received by encoding all main and sub id combinations of the TII database transmitted in the fast information channel and not for the whole null symbol. The transmission of the complete database of the TII information in the fast information channel is specified in the ETS 300 401. Hence, each receiver can encode which main and sub ids are transmitted in the region of the single frequency network. The subset of received TII codes give a rough localisation of the mobile receiver. With the estimation of the propagation delay of at least 3 transmitters and hyperbolic navigation a more precise localisation is possible.

Figure 5:
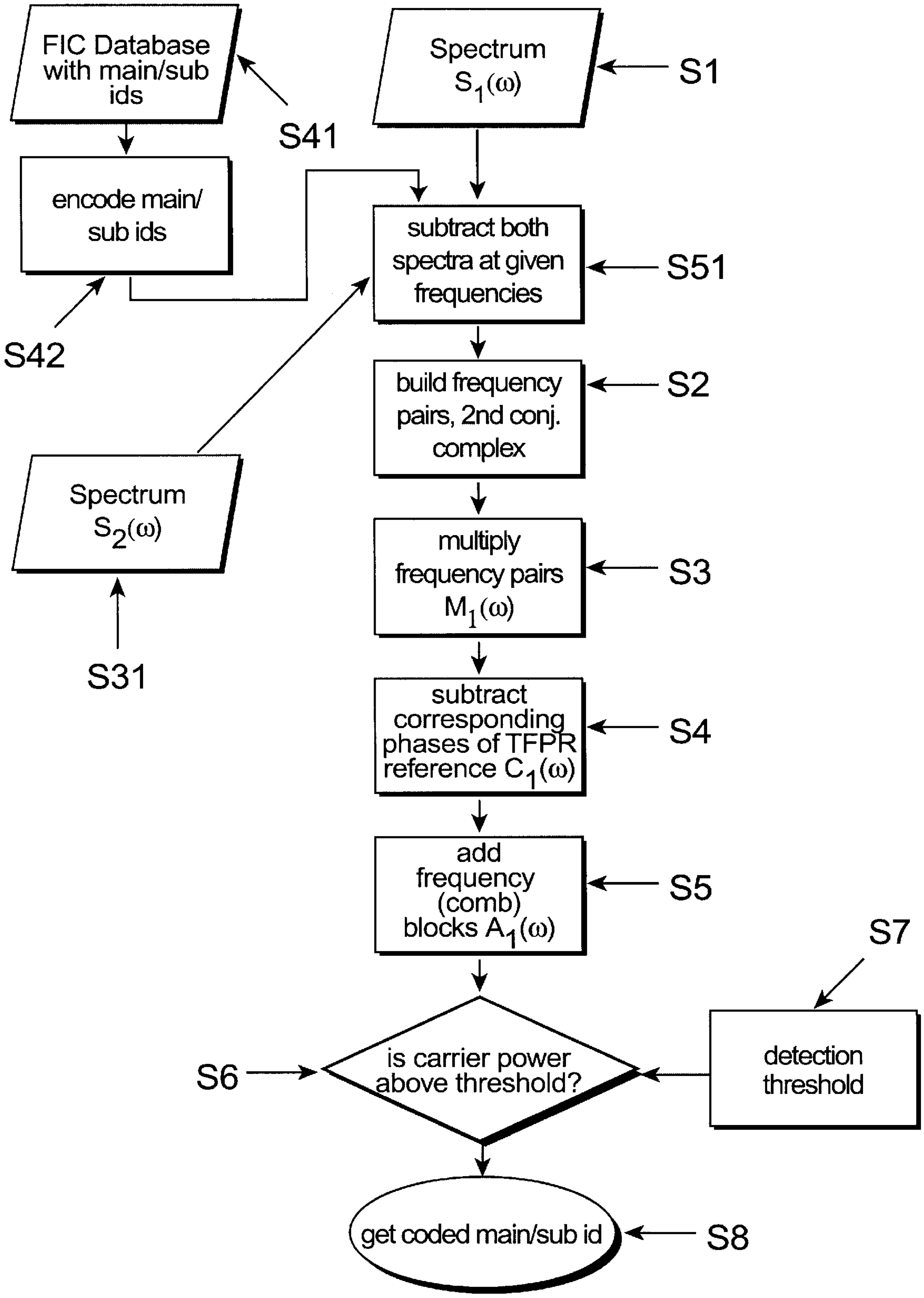
FIG. 5 shows a fifth embodiment according to the method of the present invention that is built from a combination of the basic embodiment and the modifications of the third and fourth embodiments.

FIG. 5 shows a fifth embodiment of the method according to the present invention. This embodiment is mainly a combination of the basic embodiment shown in FIG. 1 and the modifications of the fourth embodiment shown in FIG. 4 and the third embodiment shown in FIG. 3. Therefore, steps S1, S31, S41 and S42 of receiving the spectra $S_1(\omega)$, $S_2(\omega)$ and the fast information channel database including the encoding of main and sub ids therefrom are performed in parallel. All the information gained from these steps are used in a step S51 that is corresponding to step S32 described in connection with FIG. 3, but subtracts both spectra only at frequencies determined by step S42 of encoding the main and sub ids. After step S31 all other steps, beginning with step S2, are performed in the same manner as described in connection with the basic embodiment shown in FIG. 1.

Figure 6:
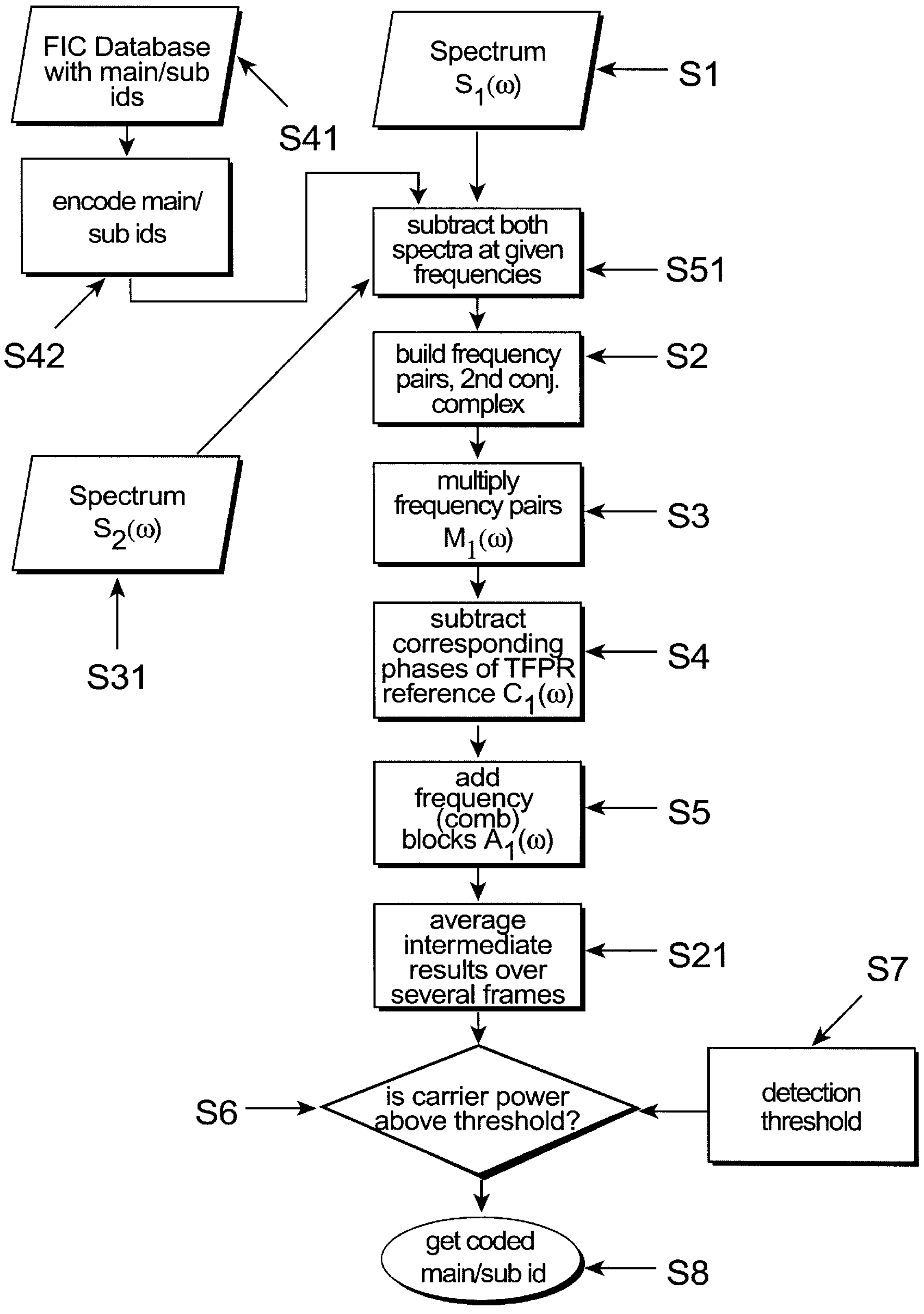
FIG. 6 shows a sixth embodiment according to the method of the present invention that is built from a combination of the basic embodiment and the modifications of the second, third and fourth embodiments.

FIG. 6 shows a sixth embodiment of the method according to the present invention. This embodiment is a combination of the basic embodiment shown in FIG. 1 with modifications of the second to fourth embodiments shown in FIGS. 2 to 4, respectively. Therefore, up to step S5 the same operation is performed as described in connection with the fifth embodiment shown in FIG. 5. In-between steps S5 and S6, step S21 of averaging the intermediate results over several frames is inserted. Thereafter, all steps are performed as described above.

Figure 7A:
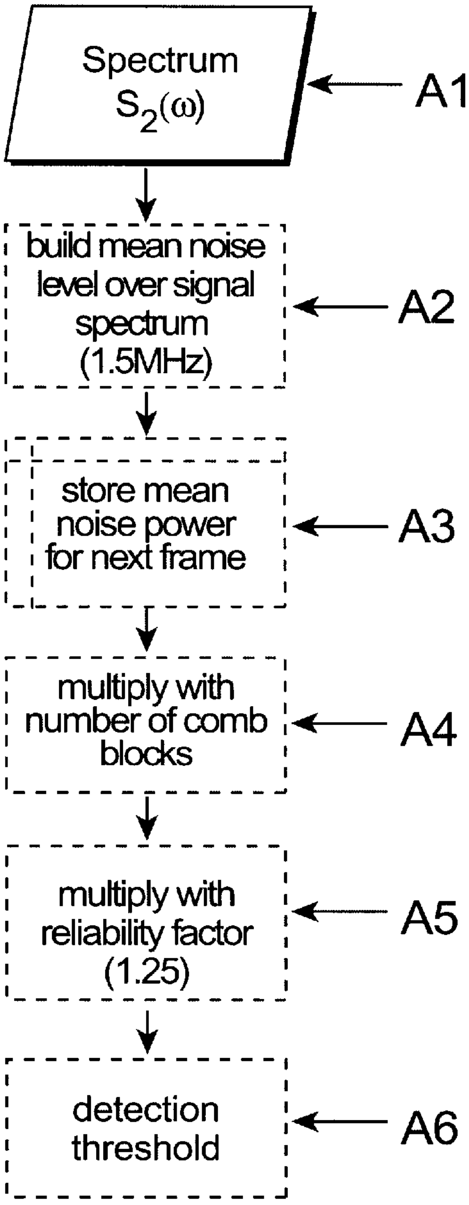
FIG. 7*a* shows a method to determine a detection threshold based on the spectrum of a null symbol not including TII pairs.
Figure 7B:
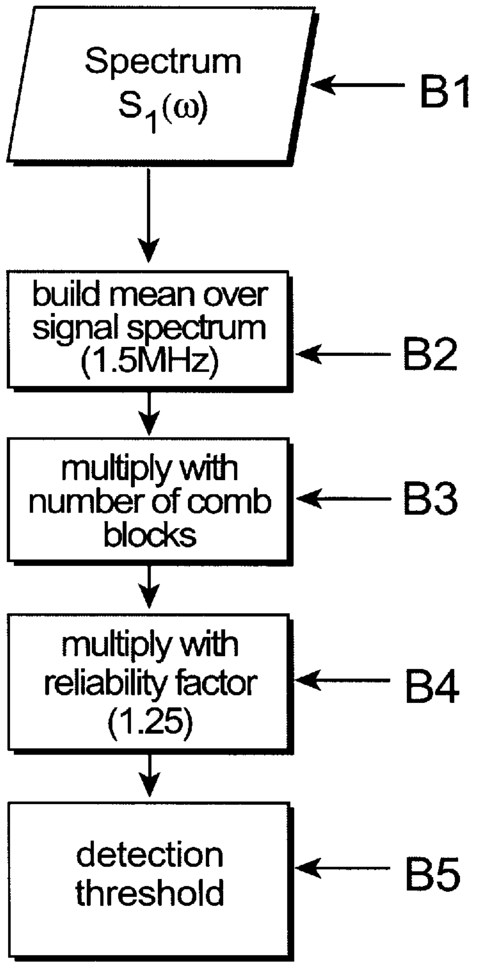
FIG. 7*b* shows a method of determining a detection threshold based on the spectrum of a null symbol including TII pairs.

FIG. 7 shows two different methods how to determine a detection threshold value. According to the first method shown in FIG. 7*a*, the detection threshold is determined from the spectrum $S_2(\omega)$ derived from the null symbol without TII pairs. According to the second method shown in FIG. 7*b*, the detection threshold is determined from the spectrum $S_1(\omega)$ derived from the null symbol including TII pairs.

For the first method, in step A1 the spectrum $S_2(\omega)$ of the null symbol without TII pairs is derived. In the following step A2, the mean noise level over the signal spectrum (1.5 MHz) is built. This mean noise power is stored in step A3 for the next frame. In step A4, the stored mean noise power is multiplied with the number of comb blocks. Thereafter, this value is multiplied with a reliability factor of 1.25 in step A5. In step A6 the resulting detection threshold is delivered, this step corresponds to step S7 of the respective preceding embodiments.

For the second method, first the spectrum $S_1(\omega)$ of the null symbol including TII pairs is derived in step B1. Thereafter, the mean value over the signal spectrum (1.5 MHz) is built in step B2. This mean value is multiplied with a number of frequency blocks in step B3. In step B4, the resulting value is multiplied with a reliability factor of 1.25. Due to the TII carriers the detection threshold value determined in step B5 is slightly higher than the effective noise amplitude. Step B5 corresponds to step S7 of the respective preceding embodiments, as step A6 of the first method to determine the threshold value does.

Figure 8:
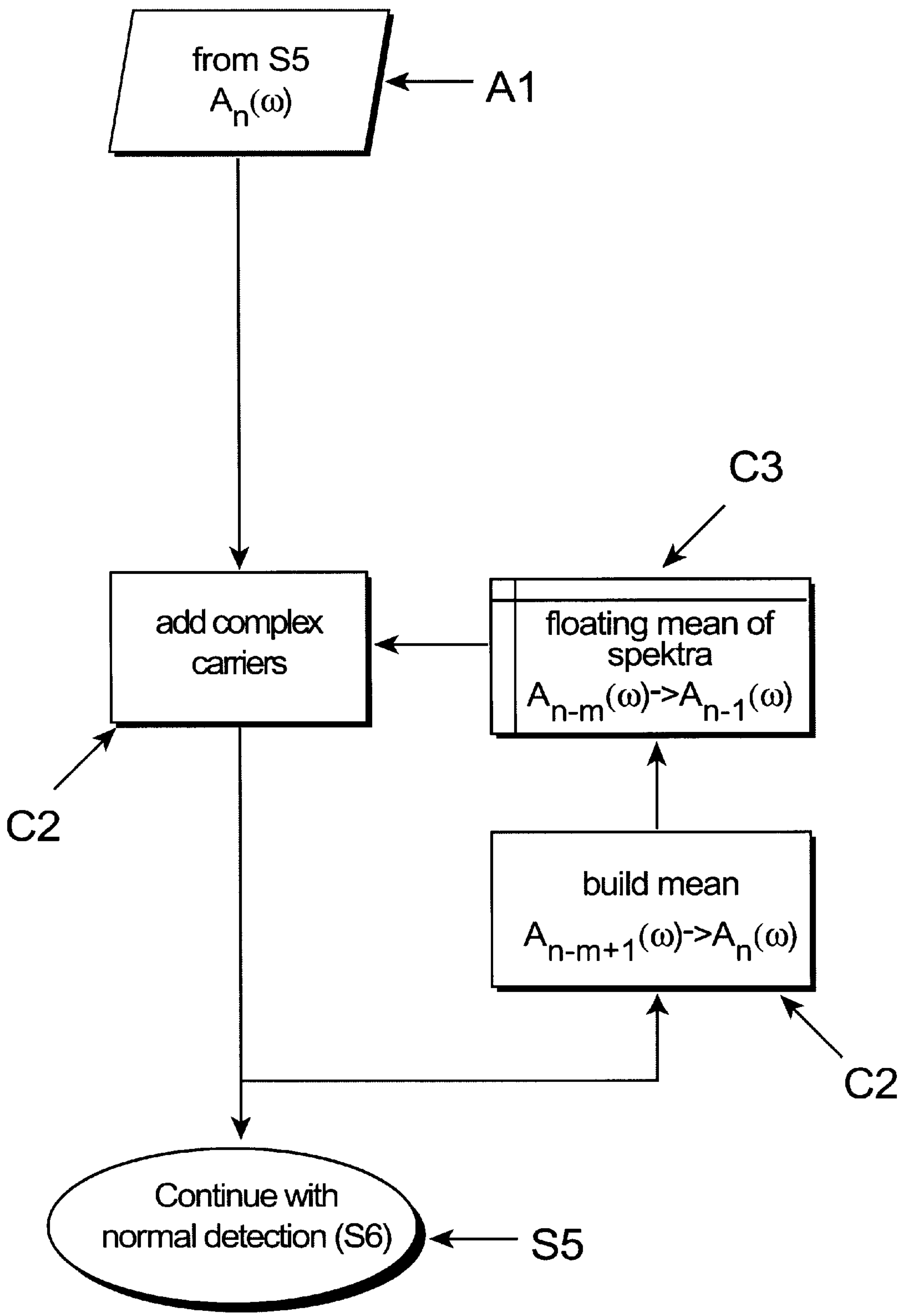
FIG. 8 shows more details of the block S21 in the second and sixth embodiments for averaging the intermediate results.

FIG. 8 shows details of block 21 in embodiments 2 and 6 for averaging the intermediate results over several frames either for a whole comb block or for the selected carriers derived by encoding the main and sub id of the FIC database.

In a first step C1 the added comb blocks $A_n(\omega)$ of the n-th frame (step S5 in FIGS. 2 and 6) are add to the stored complex carriers of the former received frames with TII. The sum is compared with the detection threshold in step S6. In parallel, in step C2 a new floating mean value is calculated for the last m spectra $A_{n-m}(\omega) \rightarrow A_n(\omega)$. In step C3 this value is stored for the next DAB frame but one with TII.

During the initialization phase when not yet 1 . . . m TII frames have been received either the mean of less frames is output or nothing is output until m frames are received.

FIG. 12 shows a possible construction of a DAB receiver. This receiver comprises a RF-front-end stage 23 and a digital processing stage 24. The digital processing stage 24 comprises an A/D-converter 25, a digital IQ-generation circuit 26, a FFT-circuit 27, a Viterbi-decoder 28, a MPEG-decoder 29, an audio D/A-converter 30, a digital signal processor 31 and a microcomputer 32. Connected to the digital processing stage 24 is a loudspeaker 33.

Figure 9:
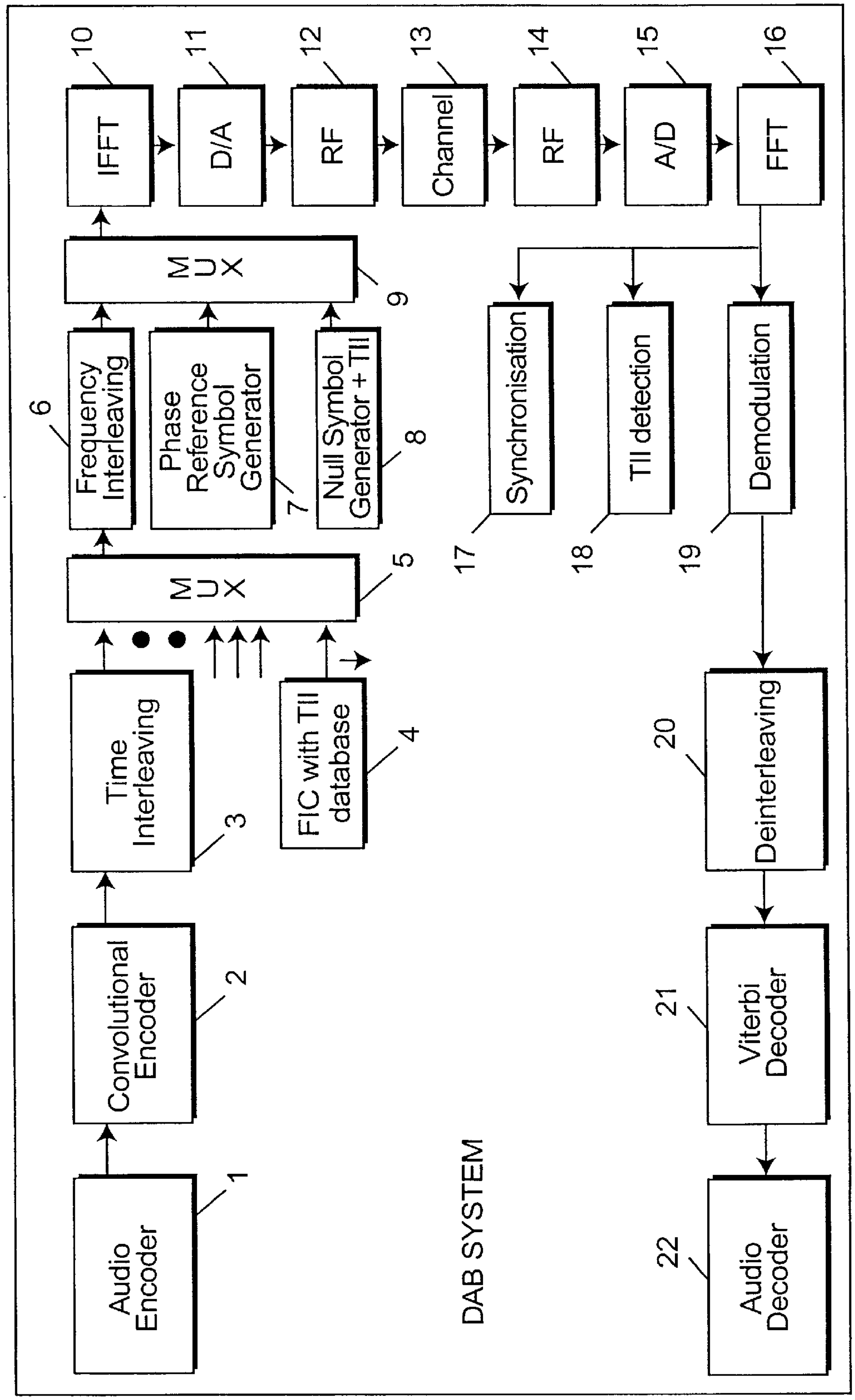
(PRIOR ART) FIGURE 9
FIG. 9 shows a general overview of a DAB system.
Figure 10:
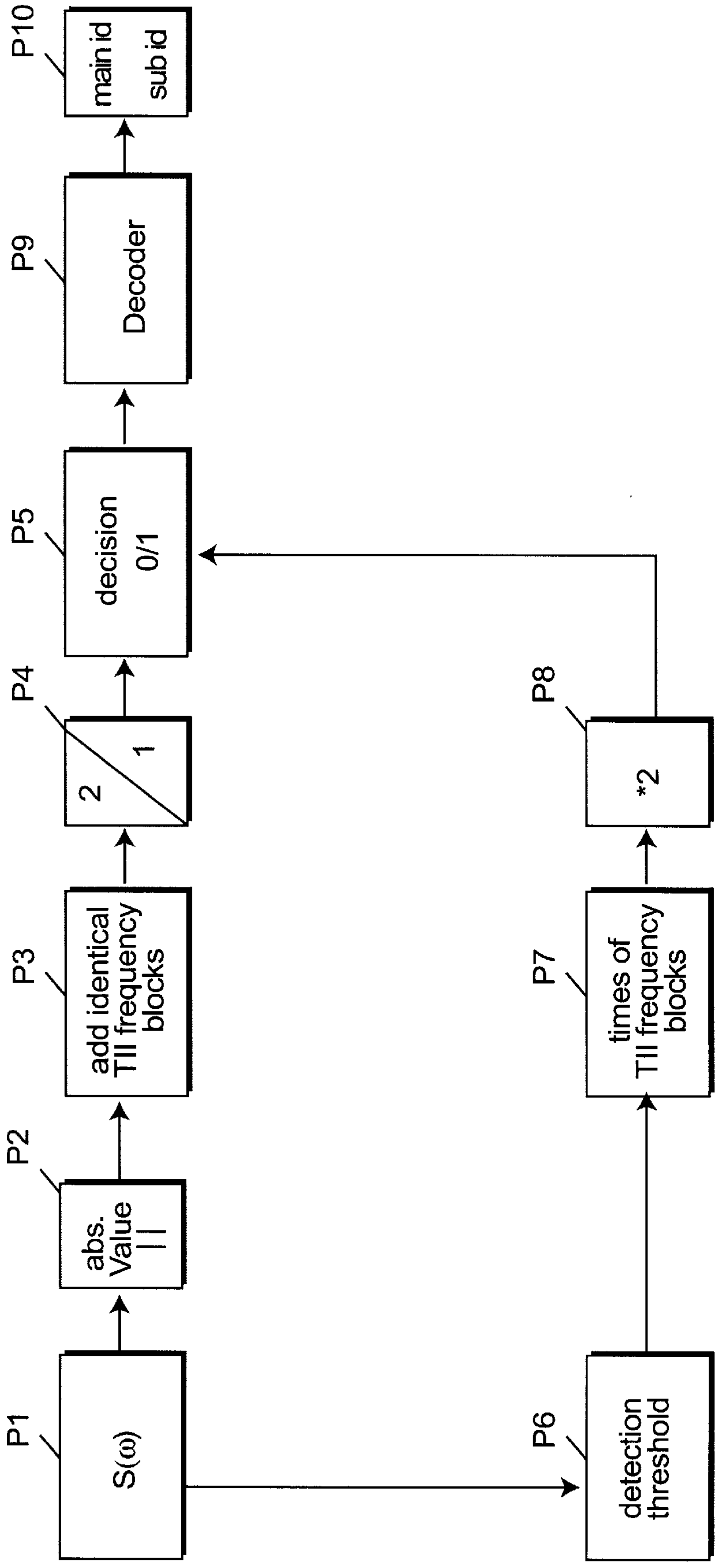
(PRIOR ART) FIGURE 10
FIG. 10 shows the detection of a transmitter identification information according to the prior art.

The shown DAB receiver is designed and works basically like a standard DAB receiver, only the TII detection according to the invention takes place in the digital processor 31. Of course, it is also possible that a special circuit designed for an optimised TII detection according to the invention is available, similar as the TII detection circuit 18 shown in FIG. 9.

What is claimed is:

1. A transmitter identification information (TII), in a Digital Audio Broadcast (DAB) stream, comprising the following steps:

a) a differential demodulation of TII pairs included in a spectrum ($S_1(\omega)$) of every other null symbol of the incoming stream (S1, S2, S3) to respectively obtain a demodulated null symbol spectrum (S4);

b) correction of carrier phases of the demodulated null symbol spectrum (S4) with a TFPR phase reference symbol;

c) determine a threshold (S7);

d) decide if a carrier is set or not by comparing a carrier level to the threshold (S7) determined in step c); and e) detecting TII from said carriers having a level above said threshold (S7);

further characterized in that said step a) comprises the following steps:

a1) grouping pairs of frequencies, comprising a first frequency and a second frequency (S2); and a2) calculating a product of a complex amplitude of the first frequency with a conjugate complex of the second frequency (S2).

2. Method according to claim 1, characterized in that said grouped pairs of frequencies are respectively the same frequencies as for a TII pair.

3. Method according to claim 1, characterized in that said step b) comprises the step of subtracting the corresponding phases of a TFPR reference transmitted in the incoming DAB stream from the differential demodulated TII pairs.

4. Method according to claim 1, characterized in that said step c) of determine a threshold comprises the following steps:

c1) calculate a mean amplitude of the FFT spectrum in a signal bandwidth of the actual null symbol including TII pairs (B2); and c2) set a value derived of the calculated the mean amplitude as threshold (B5).

5. A transmitter identification information (TII), in a Digital Audio Broadcast (DAB) stream, comprising the following steps:

a) a differential demodulation of TII pairs included in a spectrum ($S_1(\omega)$) of every other null symbol of the incoming DAB stream (S1, S2, S3) to respectively obtain a demodulated null symbol spectrum S4;

b) correction of carrier phases of the demodulated null symbol spectrum (S4) with a TFPR phase reference symbol;

c) determine a threshold (S7);

d) decide if a carrier is set or not by comparing a carrier level to the threshold (S7) determined in step c); and e) detecting TII from said carriers having a level above said threshold (S7);

further characterized in that said step b) comprises the step of swapping of real and imaginary parts and changing signs of the differential demodulated TII pairs.

6. A transmitter identification information (TII), in a Digital Audio Broadcast (DAB) stream, comprising the following steps:

a) a differential demodulation of TII pairs included in a spectrum ($S_1(\omega)$) of every other null symbol of the incoming DAB stream (S1, S2, S3) to respectively obtain a demodulated null symbol spectrum (S4);

b) correction of carrier phases of the demodulated null symbol spectrum (S4) with a TFPR phase reference symbol;

c) determine a threshold (S7);

d) decide if a carrier is set or not by comparing a carrier level to the threshold (S7) determined in step c); and e) detecting TII from said carriers having a level above said threshold (S7);

further characterized by averaging several incoming null symbols including TII pairs of the DAB streams (S21) after said step a) of differential demodulation or step b) of phase correction.

7. Method to detect transmitter identification information (TII), in a Digital Audio Broadcast (DAB) stream, comprising the following steps:

a) a differential demodulation of TII pairs included in a spectrum ($S_1(\omega)$) of every second null symbol of the incoming DAB stream (S1, S2, S3) to respectively obtain a demodulated null symbol spectrum;

b) correction of carrier phases of the demodulated null symbol spectrum (S4) with a TFPR phase reference symbol;

c) determine a threshold (S7);

d) decide if a carrier is set or not by comparing a carrier level to the threshold (S7) determined in step c); and e) detecting TII from said carriers having a level above said threshold (S7);

further characterized by calculating the difference between a spectrum of the null symbol including TII pairs and the spectrum of the succeeding or preceding null symbol not including TII pairs (S32) before said step a) of differential demodulation.

8. A transmitter identification information (TII), in a Digital Audio Broadcast (DAB) stream, comprising the following steps:

a) a differential demodulation of TII pairs included in a spectrum ($S_1(\omega)$) of every other null symbol of the incoming DAB stream (S1, S2, S3) to respectively obtain a demodulated null symbol spectrum S4;

b) correction of carrier phases of the demodulated null symbol spectrum (S4) with a TFPR phase reference symbol;

c) determine a threshold (S7);

d) decide if a carrier is set or not by comparing a carrier level to the threshold (S7) determined in step c); and e) detecting TII from said carriers having a level above said threshold (S7);

further characterized in that said step a) of differential demodulation of TII pairs includes respectively the differential demodulation of the whole spectrum or only the part with OFDM carriers of the null symbol including TII pairs of the incoming DAB stream.

9. A transmitter identification information (TII), in a Digital Audio Broadcast (DAB) stream, comprising the following steps:

a) a differential demodulation of TII pairs included in a spectrum ($S_1(\omega)$) of every other null symbol of the incoming DAB stream (S1, S2, S3) to respectively obtain a demodulated null symbol spectrum (S4);

b) correction of carrier phases of the demodulated null symbol spectrum (S4) with a TFPR phase reference symbol;

c) determine a threshold (S7);

d) decide if a carrier is set or not by comparing a carrier level to the threshold (S7) determined in step c); and e) detecting TII from said carriers having a level above said threshold (S7);

further characterized in that said step a) of differential demodulation of TII pairs includes respectively encoding of all main and sub id combinations of a TII database transmitted in a fast information channel and the differential demodulation of only the positions of the spectrum of the null symbol including TII pairs of the incoming DAB stream derived by encoding of all main and sub id combinations of the TII database.

10. A transmitter identification information (TII), in a Digital Audio Broadcast (DAB) stream, comprising the following steps:

a) a differential demodulation of TII pairs included in a spectrum ($S_1(\omega)$) of every other null symbol of the incoming DAB stream (S1, S2, S3) to respectively obtain a demodulated null symbol spectrum (S4);

b) correction of carrier phases of the demodulated null symbol spectrum (S4) with a TFPR phase reference symbol;

c) determine a threshold (S7);

d) decide if a carrier is set or not by comparing a carrier level to the threshold (S7) determined in step c); and e) detecting TII from said carriers having a level above said threshold (S7);

further characterized in that a step of adding a comb blocks of the demodulated null symbol spectrum having corrected carrier phases is performed after the step b) of correction of the demodulated carrier phases.

11. A transmitter identification information (TII), in a Digital Audio Broadcast (DAB) stream, comprising the following steps:

a) a differential demodulation of TII pairs included in a spectrum ($S_1(\omega)$) of every other null symbol of the incoming DAB stream (S1, S2, S3) to respectively obtain a demodulated null symbol spectrum (S4);

b) correction of carrier phases of the demodulated null symbol spectrum (S4) with a TFPR phase reference symbol;

c) determine a threshold (S7);

d) decide if a carrier is set or not by comparing a carrier level to the threshold (S7) determined in step c); and e) detecting TII from said carriers having a level above said threshold (S7);

further characterized in that said step c) of determine a threshold comprises the following steps:

c1) calculate a mean noise level of an FFT spectrum in a signal bandwidth of an null symbol preceding or succeeding to a null symbol including TII pairs (A2);

c2) storing the mean noise level for a next frame of the incoming DAB stream including a null symbol with TII pairs (A3); and c3) set a value derived of the stored mean noise level as threshold (A6).

12. Method according to claim 11, characterized in that said calculated mean noise level value is multiplied with a number of frequency blocks (B3; A4) before the threshold is set.

13. Method according to claim 11, characterized in that said calculated mean noise level is multiplied with a reliability factor (B4; A5) before the threshold is set.

14. Method according to claim 13, characterized in that said reality factor is 1.25.

* * * * *